US010030526B2

(12) United States Patent
Foster et al.

(10) Patent No.: US 10,030,526 B2
(45) Date of Patent: Jul. 24, 2018

(54) PLATFORM CORE FEED FOR A MULTI-WALL BLADE

(71) Applicant: General Electric Company, Schenectady, NY (US)

(72) Inventors: Gregory Thomas Foster, Greer, SC (US); Elisabeth Kraus Black, Greenville, SC (US); Michelle Jessica Iduate, Simpsonville, SC (US); Brendon James Leary, Simpsonville, SC (US); Jacob Charles Perry, II, Taylors, SC (US); David Wayne Weber, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 254 days.

(21) Appl. No.: 14/977,200

(22) Filed: Dec. 21, 2015

(65) Prior Publication Data

US 2017/0175545 A1 Jun. 22, 2017

(51) Int. Cl.
*F02C 7/12* (2006.01)
*F01D 5/18* (2006.01)

(52) U.S. Cl.
CPC .......... *F01D 5/187* (2013.01); *F05D 2230/10* (2013.01); *F05D 2240/81* (2013.01); *F05D 2260/202* (2013.01)

(58) Field of Classification Search
CPC .. F01D 5/187; F05D 2230/10; F05D 2240/81; F05D 2260/202
See application file for complete search history.

(56) References Cited

U.S. PATENT DOCUMENTS

| | | | | |
|---|---|---|---|---|
| 3,191,908 | A | | 6/1965 | Powell et al. |
| 4,474,532 | A | | 10/1984 | Pazder |
| 4,500,258 | A | | 2/1985 | Dodd et al. |
| 4,650,399 | A | | 3/1987 | Craig et al. |
| 4,753,575 | A | | 6/1988 | Levengood et al. |
| 5,296,308 | A | | 3/1994 | Caccavale et al. |
| 5,356,265 | A | | 10/1994 | Kercher |
| 5,382,135 | A | * | 1/1995 | Green .................... F01D 5/145 415/115 |
| 5,403,159 | A | | 4/1995 | Green et al. |
| 5,702,232 | A | | 12/1997 | Moore |

(Continued)

FOREIGN PATENT DOCUMENTS

| | | | |
|---|---|---|---|
| EP | 1 503 038 | A1 | 2/2005 |
| JP | 2002242607 | A | 8/2002 |

OTHER PUBLICATIONS

U.S. Appl. No. 14/977,152, Office Action 1 dated Sep. 14, 2017, 15 pages.

(Continued)

*Primary Examiner* — Jesse Bogue
(74) *Attorney, Agent, or Firm* — Ernest Cusick; Hoffman Warnick LLC

(57) ABSTRACT

A cooling system for a turbine bucket including a multi-wall blade and a platform. A cooling circuit for the multi-wall blade includes: an outer cavity circuit and a central cavity for collecting cooling air from the outer cavity circuit; a platform core air feed for receiving the cooling air from the central cavity; and an air passage for fluidly connecting the platform core air feed to a platform core of the platform.

10 Claims, 8 Drawing Sheets

(56) References Cited

U.S. PATENT DOCUMENTS

| | | | | |
|---|---|---|---|---|
| 5,813,835 | A | 9/1998 | Corsmeier et al. | |
| 5,853,044 | A | 12/1998 | Wheaton et al. | |
| 6,196,792 | B1 | 3/2001 | Lee et al. | |
| 6,220,817 | B1 | 4/2001 | Durgin et al. | |
| 6,264,428 | B1 | 7/2001 | Dailey et al. | |
| 6,416,284 | B1 * | 7/2002 | Demers | F01D 5/186 415/115 |
| 6,478,535 | B1 | 11/2002 | Chung et al. | |
| 6,491,496 | B2 | 12/2002 | Starkweather | |
| 6,705,836 | B2 | 3/2004 | Bourriaud et al. | |
| 6,887,033 | B1 * | 5/2005 | Phillips | F01D 5/147 415/115 |
| 6,916,155 | B2 | 7/2005 | Eneau et al. | |
| 6,974,308 | B2 | 12/2005 | Halfmann et al. | |
| 7,104,757 | B2 | 9/2006 | Gross | |
| 7,217,097 | B2 | 5/2007 | Liang | |
| 7,303,376 | B2 | 12/2007 | Liang | |
| 7,527,475 | B1 | 5/2009 | Liang | |
| 7,607,891 | B2 | 10/2009 | Cherolis et al. | |
| 7,625,178 | B2 | 12/2009 | Morris et al. | |
| 7,686,581 | B2 | 3/2010 | Brittingham et al. | |
| 7,780,413 | B2 * | 8/2010 | Liang | F01D 5/188 416/97 R |
| 7,780,415 | B2 | 8/2010 | Liang | |
| 7,785,072 | B1 | 8/2010 | Liang | |
| 7,819,629 | B2 | 10/2010 | Liang | |
| 7,838,440 | B2 | 11/2010 | Park | |
| 7,857,589 | B1 | 12/2010 | Liang | |
| 7,862,299 | B1 | 1/2011 | Liang | |
| 7,901,183 | B1 | 3/2011 | Liang | |
| 7,980,822 | B2 | 7/2011 | Cunha et al. | |
| 8,011,888 | B1 | 9/2011 | Liang | |
| 8,047,790 | B1 | 11/2011 | Liang | |
| 8,087,891 | B1 | 1/2012 | Liang | |
| 8,157,505 | B2 | 4/2012 | Liang | |
| 8,292,582 | B1 | 10/2012 | Liang | |
| 8,616,845 | B1 | 12/2013 | Liang | |
| 8,678,766 | B1 | 3/2014 | Liang | |
| 8,734,108 | B1 | 5/2014 | Liang | |
| 2003/0223862 | A1 | 12/2003 | DeMarche et al. | |
| 2005/0031452 | A1 | 2/2005 | Liang | |
| 2007/0128031 | A1 | 6/2007 | Liang | |
| 2008/0118366 | A1 * | 5/2008 | Correia | F01D 5/187 416/97 R |
| 2008/0175714 | A1 | 7/2008 | Sprangler et al. | |
| 2011/0123310 | A1 * | 5/2011 | Beattie | F01D 5/18 415/115 |
| 2011/0236221 | A1 | 9/2011 | Campbell | |
| 2012/0034102 | A1 | 2/2012 | Boyer | |
| 2012/0082564 | A1 | 4/2012 | Ellis et al. | |
| 2012/0082566 | A1 * | 4/2012 | Ellis | F01D 5/087 416/97 R |
| 2013/0171003 | A1 * | 7/2013 | Ellis | F01D 5/187 416/97 R |
| 2014/0096538 | A1 * | 4/2014 | Boyer | F01D 5/081 60/806 |
| 2015/0059355 | A1 | 3/2015 | Feigl et al. | |
| 2015/0184519 | A1 | 7/2015 | Foster et al. | |
| 2015/0184538 | A1 * | 7/2015 | Smith | F01D 25/12 416/97 R |
| 2016/0194965 | A1 | 7/2016 | Spangler | |
| 2016/0312632 | A1 | 10/2016 | Hagan et al. | |
| 2016/0312637 | A1 | 10/2016 | Duguay | |

OTHER PUBLICATIONS

U.S. Appl. No. 14/977,124, Office Action 1 dated Oct. 10, 2017, 15 pages.

U.S. Appl. No. 14/977,175, Office Action 1 dated Nov. 24, 2017, 25 pages.

U.S. Appl. No. 14/977,152, Final Office Action 1 dated Dec. 26, 2017, 15 pages.

U.S. Appl. No. 14/977,228, Notice of Allowance dated Feb. 12, 2018, 34 pages.

U.S. Appl. No. 14/977,247, Notice of Allowance dated Feb. 12, 2018, 24 pages.

Extended European Search Report and Opinion issued in connection with corresponding EP Application No. 16203975.4 dated Oct. 16, 2017.

U.S. Appl. No. 14/977,270, Office Action dated Mar. 21, 2018, 42 pages.

U.S. Appl. No. 14/977,124, Notice of Allowance dated Mar. 19, 2018, 21 pages.

U.S. Appl. No. 14/977,102, Office Action dated Mar. 30, 2018, 39 pages.

U.S. Appl. No. 14/977,078, Office Action, dated Apr. 19, 2018, 39 pages.

* cited by examiner

PLATFORM CORE FEED FOR A MULTI-WALL BLADE

CROSS-REFERENCE TO RELATED APPLICATIONS

This application is related to co-pending U.S. application Ser. Nos. 14/977,228, 14/977,078, 14/977,124, 14/977,152, 14/977,175, 14/977,102, 14/977,247 and 14/977,270, all filed on Dec. 21, 2015 and co-pending U.S. application Ser. Nos. 15/239,994, 15/239,968, 15/239,985, 15/239,940 and 15/239,930 all filed on Aug. 18, 2016.

BACKGROUND OF THE INVENTION

The disclosure relates generally to turbine systems, and more particularly, to a platform core feed for a multi-wall blade.

Gas turbine systems are one example of turbomachines widely utilized in fields such as power generation. A conventional gas turbine system includes a compressor section, a combustor section, and a turbine section. During operation of a gas turbine system, various components in the system, such as turbine blades, are subjected to high temperature flows, which can cause the components to fail. Since higher temperature flows generally result in increased performance, efficiency, and power output of a gas turbine system, it is advantageous to cool the components that are subjected to high temperature flows to allow the gas turbine system to operate at increased temperatures.

Turbine blades typically contain an intricate maze of internal cooling channels. Cooling air provided by, for example, a compressor of a gas turbine system may be passed through the internal cooling channels to cool the turbine blades.

Multi-wall turbine blade cooling systems may include internal near wall cooling circuits. Such near wall cooling circuits may include, for example, near wall cooling channels adjacent the outside walls of a multi-wall blade. The near wall cooling channels are typically small, requiring less cooling flow, still maintaining enough velocity for effective cooling to occur. Other, typically larger, low cooling effectiveness central channels of a multi-wall blade may be used as a source of cooling air and may be used in one or more reuse circuits to collect and reroute “spent” cooling flow for redistribution to lower heat load regions of the multi-wall blade.

BRIEF DESCRIPTION OF THE INVENTION

A first aspect of the disclosure provides cooling system for a turbine bucket including a multi-wall blade and a platform. The cooling circuit for the multi-wall blade includes: an outer cavity circuit and a central cavity for collecting cooling air from the outer cavity circuit; a platform core air feed for receiving the cooling air from the central cavity; and an air passage for fluidly connecting the platform core air feed to a platform core of the platform A second aspect of the disclosure provides a method of forming a cooling circuit for a turbine bucket, the turbine bucket including a multi-wall blade and a platform, including: forming a hole that extends from an exterior of the turbine bucket, through a platform core air feed, and into a platform core of the platform, the platform core air feed connected to a central cavity of the multi-wall blade; and plugging a portion of the hole adjacent the exterior of the turbine bucket; wherein an unplugged portion of the hole forms an air passage between the platform core air feed and the platform core.

A third aspect of the disclosure provides a turbomachine, including: a gas turbine system including a compressor component, a combustor component, and a turbine component, the turbine component including a plurality of turbine buckets, wherein at least one of the turbine buckets includes a multi-wall blade and a platform; and a cooling circuit disposed within the multi-wall blade, the cooling circuit including: an outer cavity circuit and a central cavity for collecting cooling air from the outer cavity circuit; a platform core air feed for receiving the cooling air from the central cavity; and an air passage for fluidly connecting the platform core air feed to a platform core of the platform.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

As indicated above, the disclosure relates generally to turbine systems, and more particularly, to a platform core feed for a multi-wall blade.

In the Figures (see, e.g., FIG. 8), the “A” axis represents an axial orientation. As used herein, the terms “axial” and/or “axially” refer to the relative position/direction of objects along axis A, which is substantially parallel with the axis of rotation of the turbomachine (in particular, the rotor section). As further used herein, the terms “radial” and/or “radially” refer to the relative position/direction of objects along an axis “r” (see, e.g., FIG. 1), which is substantially perpendicular with axis A and intersects axis A at only one location. Additionally, the terms “circumferential” and/or “circumferentially" refer to the relative position/direction of objects along a circumference (c) which surrounds axis A but does not intersect the axis A at any location.

Figure 1:
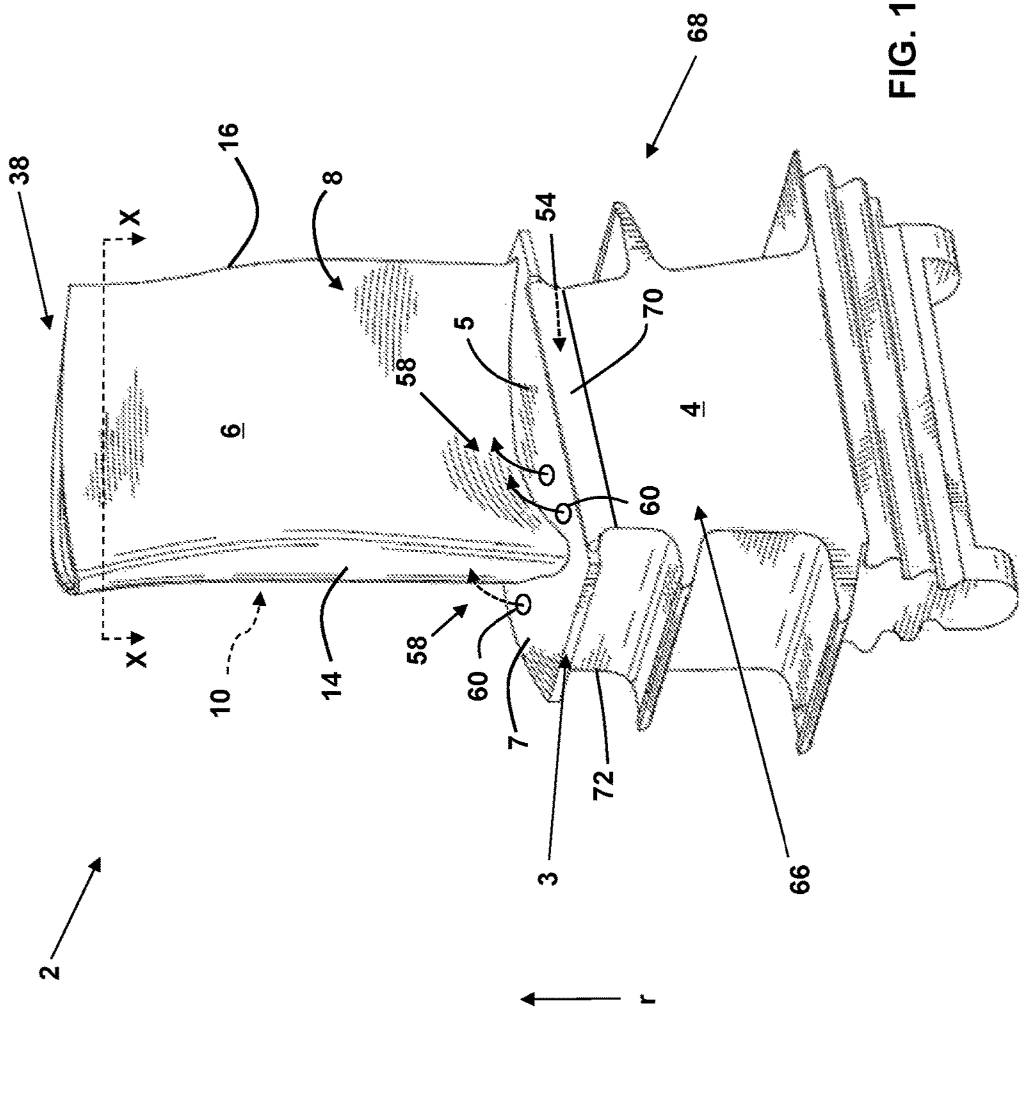
FIG. 1 shows a perspective view of a turbine bucket including a multi-wall blade according to embodiments.

Turning to FIG. 1, a perspective view of a turbine bucket 2 is shown. The turbine bucket 2 includes a shank 4 and a multi-wall blade 6 coupled to and extending radially outward from the shank 4. The multi-wall blade 6 includes a pressure side 8, an opposed suction side 10, and a tip area 38. The multi-wall blade 6 further includes a leading edge 14 between the pressure side 8 and the suction side 10, as well as a trailing edge 16 between the pressure side 8 and the suction side 10 on a side opposing the leading edge 14. The multi-wall blade 6 extends radially away from a platform 3 including a pressure side platform 5 and a suction side platform 7. The platform 3 is disposed at an intersection or transition between the multi-wall blade 6 and the shank 4.

The shank 4 and multi-wall blade 6 may each be formed of one or more metals (e.g., steel, alloys of steel, etc.) and may be formed (e.g., cast, forged or otherwise machined) according to conventional approaches. The shank 4 and multi-wall blade 6 may be integrally formed (e.g., cast, forged, three-dimensionally printed, etc.), or may be formed as separate components which are subsequently joined (e.g., via welding, brazing, bonding or other coupling mechanism).

Figure 2:
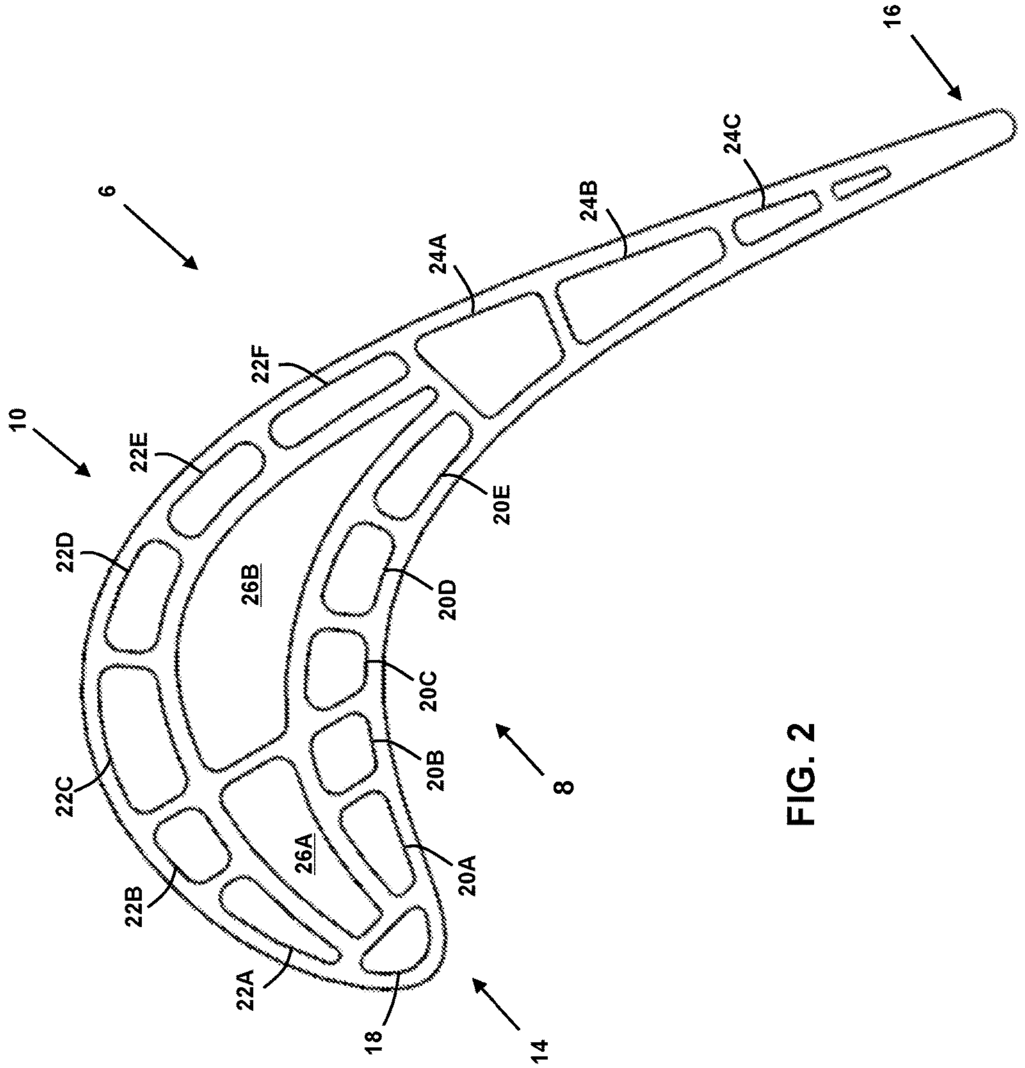
FIG. 2 is a cross-sectional view of the multi-wall blade of FIG. 1, taken along line X-X in FIG. 1 according to various embodiments.

FIG. 2 depicts a cross-sectional view of the multi-wall blade 6 taken along line X-X of FIG. 1. As shown, the multi-wall blade 6 may include a plurality of internal cavities. In embodiments, the multi-wall blade 6 includes a leading edge cavity 18, a plurality of pressure side (near wall) cavities 20A-20E, a plurality of suction side (near wall) cavities 22A-22F, a plurality of trailing edge cavities 24A-24C, and a plurality of central cavities 26A, 26B. The number of cavities 18, 20, 22, 24, 26 within the multi-wall blade 6 may vary, of course, depending upon for example, the specific configuration, size, intended use, etc., of the multi-wall blade 6. To this extent, the number of cavities 18, 20, 22, 24, 26 shown in the embodiments disclosed herein is not meant to be limiting. According to embodiments, various cooling circuits can be provided using venous combinations of the cavities 18, 20, 22, 24, 26.

Figure 4:
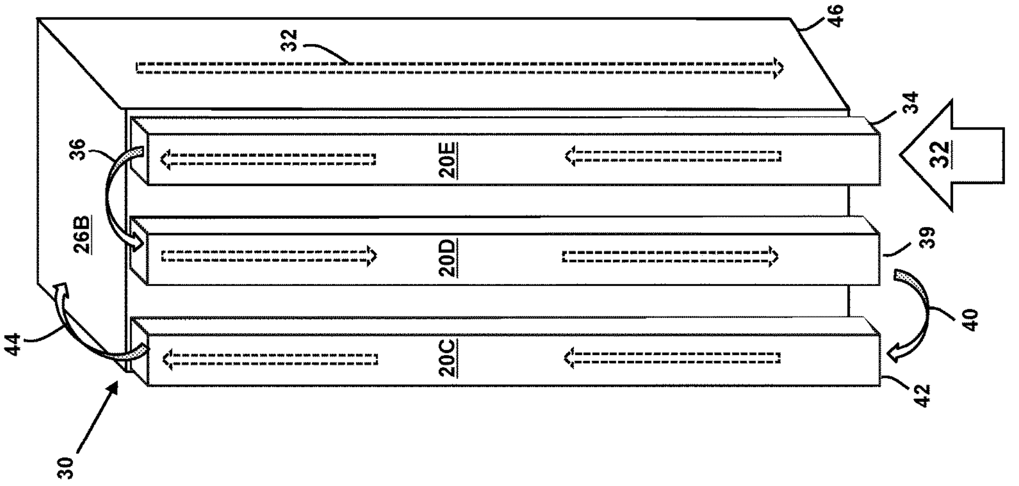
FIG. 4 is a perspective view of the mid-blade pressure side cooling circuit according to various embodiments.
Figure 3:
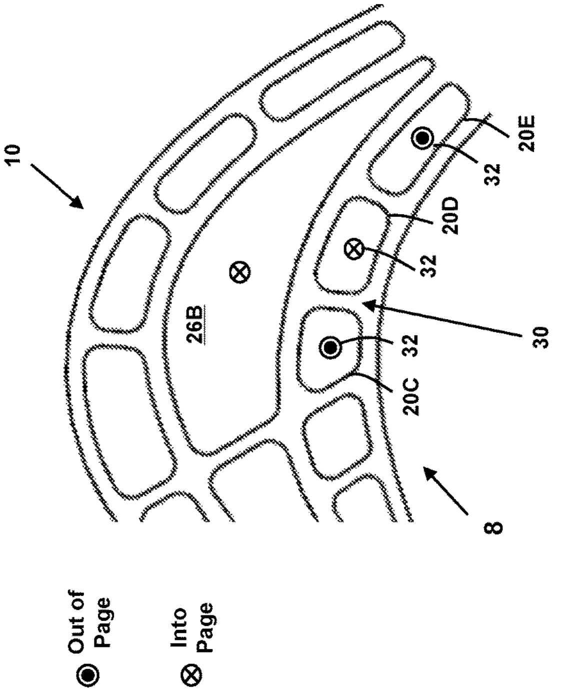
FIG. 3 depicts a portion of the cross-sectional view of FIG. 2 showing a mid-blade pressure side cooling circuit according to various embodiments.

An embodiment including a cooling circuit, for example, a mid-blade pressure side cooling circuit 30, is depicted in FIGS. 3 and 4. The pressure side cooling circuit 30 is located adjacent the pressure side 8 of the multi-wall blade 6, between the leading edge 14 and the trailing edge 16. The pressure side cooling circuit 30 is a forward-flowing three-pass serpentine circuit formed by pressure side cavities 20C, 20D, and 22E. In other embodiments, an aft-flowing three-pass serpentine cooling circuit may be provided for example, by reversing the flow direction of the cooling air through the pressure side cavities 20C-20E.

Referring to FIGS. 3 and 4 together with FIG. 1, a supply of cooling air 32, generated for example by a compressor 104 of a gas turbine system 102 (FIG. 8), is fed (e.g., via at least one cooling air feed) through the shank 4 to a base 34 of the pressure side cavity 20E. The cooling air 32 flows radially outward through the pressure side cavity 20E toward a tip area 38 (FIG. 1) of the multi-wall blade 6. A turn 36 redirects the cooling air 32 from the pressure side cavity 20E into the pressure side cavity 20D. The cooling air 32 flows radially inward through the pressure side cavity 20D toward a base 39 of the pressure side cavity 20D. A turn 40 redirects the cooling air 32 from the base 39 of the pressure side cavity 20D into a base 42 of the pressure side cavity 20C. The cooling air 32 flows radially outward through the pressure side cavity 20C toward the tip area 38 of the multi-wall blade 6. A turn 44 redirects the cooling air 32 from the pressure side cavity 20C into the central cavity 26B. The cooling air 32 flows radially inward through the central cavity 26B toward a base 46 of the central cavity 26B.

Figure 5:
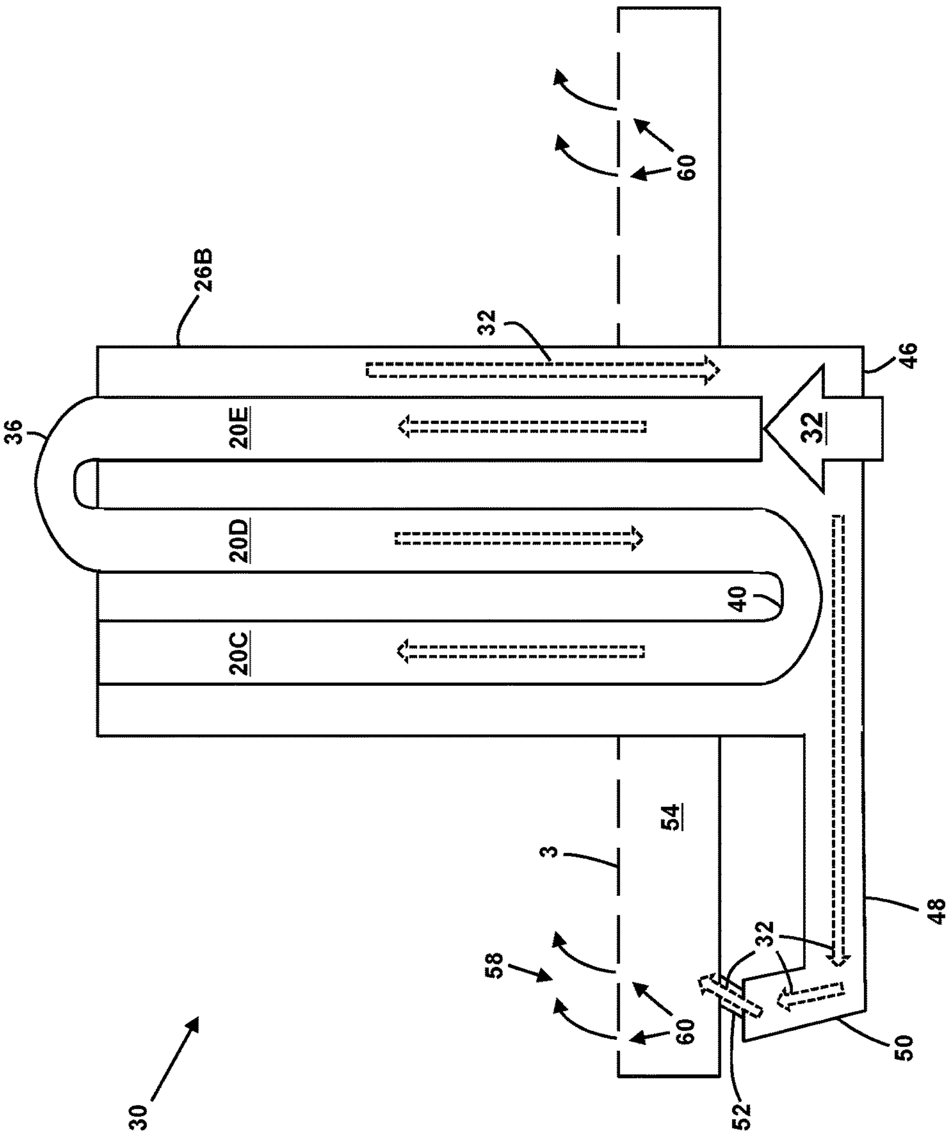
FIG. 5 is a side view of the mid-blade pressure side cooling circuit according to various embodiments.

Reference is now made to FIG. 5 in conjunction with FIG. 1. FIG. 5 is a side view of the mid-blade pressure side cooling circuit 30 according to various embodiments. As shown, the cooling air 32 flows from the base 46 of the central cavity 26B into a platform core air feed 48, which extends away from the central cavity 26B toward a side of the shank 4. The platform core air feed 48 includes an end tab 50. An air passage 52 extends from the end tab 50 of the platform core air feed 48 into a core 54 of the platform 3. The air passage 52 allows the cooling air 32 to flow through the end tab 50 of the platform core air feed 48 into the platform core 54, cooling the platform 3 (e.g., via convection cooling). The platform 3 may comprise the pressure side platform 5 and/or the suction side platform 7. The cooling air 32 may exit as cooling film 58 from the platform core 54 via at least one film aperture 60 to provide film cooling of the platform 3.

A method of fluidly connecting the end tab 50 of the platform core air feed 48 to the platform core 54 according to embodiments is described below with regard to FIGS. 6 and 7. Although described in conjunction with a mid-blade pressure side cooling circuit 30, it should be apparent that the concepts disclosed herein may be adapted for use with any cooling circuit that is configured to provide cooling air to a platform core or other core that may require cooling.

Figure 6:
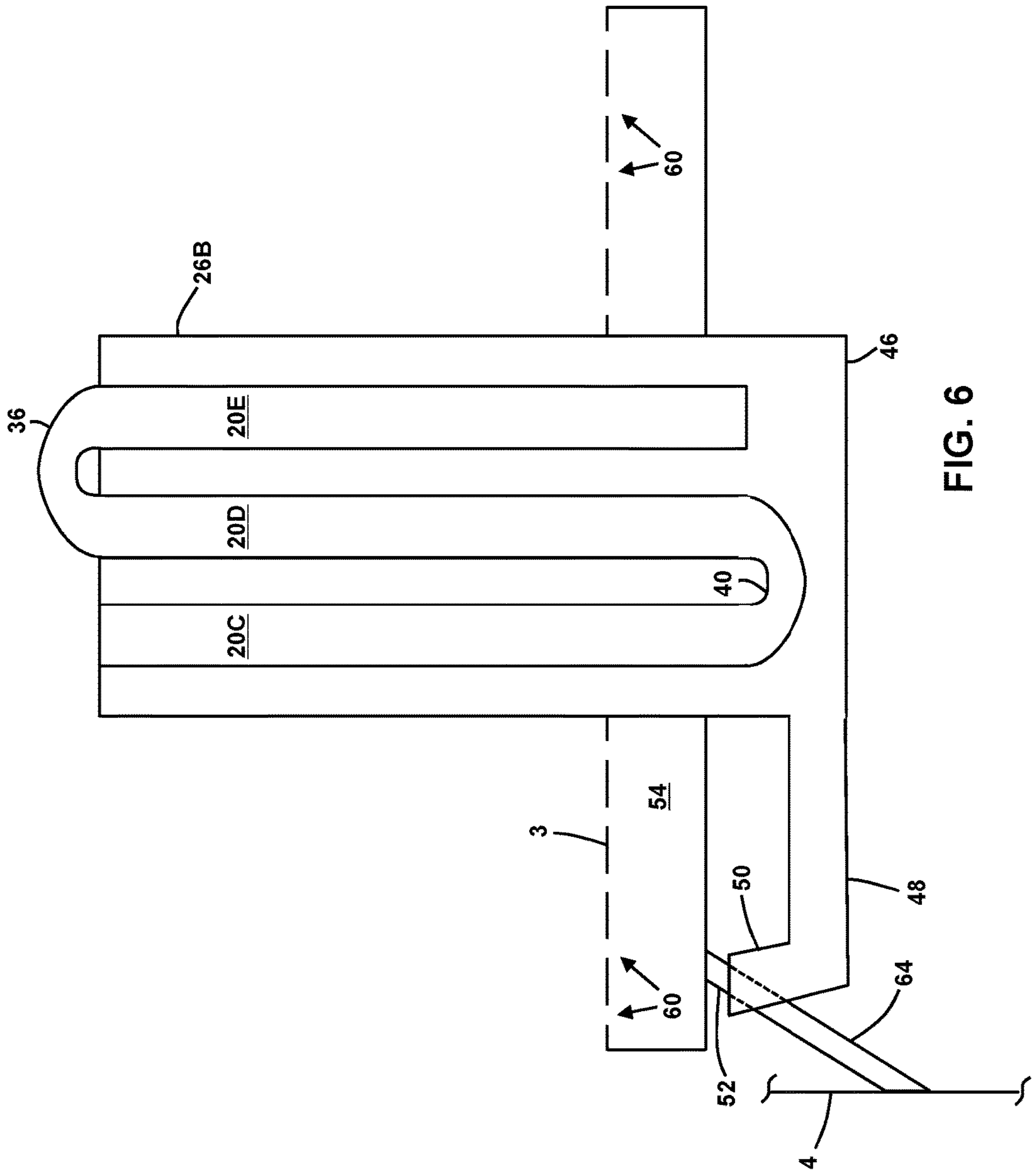
FIGS. 6 and 7 depict a method for connecting a platform core feed to a platform core according to various embodiments.

In FIG. 6, a machining operation (e.g., a drilling operation) is performed to form a drill hole 64 from the exterior of the shank 4 to the platform core 54. As shown, the drill hole 64 extends through the shank 4 and end tab 50 of the platform core air feed 48 into an interior of the platform core 54. The portion of the drill hole 64 between the end tab 50 of the platform core air feed 48 forms the air passage 52. Referring also to FIG. 1, the drill hole 64 may be formed in the pressure side shank 66 or the suction side shank 68. In other embodiments, the drill hole 64 may be formed in a pressure side slash face 70, a suction side slash face 72, or through platform printouts. In other embodiments, the extension channel 48 may not include an end tab 50. In this case, the drill hole 64 may pass through the extension channel 48 into the platform core 54. In general, the drill hole 64 may be oriented in any suitable location such that the drill hole 64 taps both a portion of the platform core air feed 48 (e.g., end tab 50) and the platform core 54.

Figure 7:
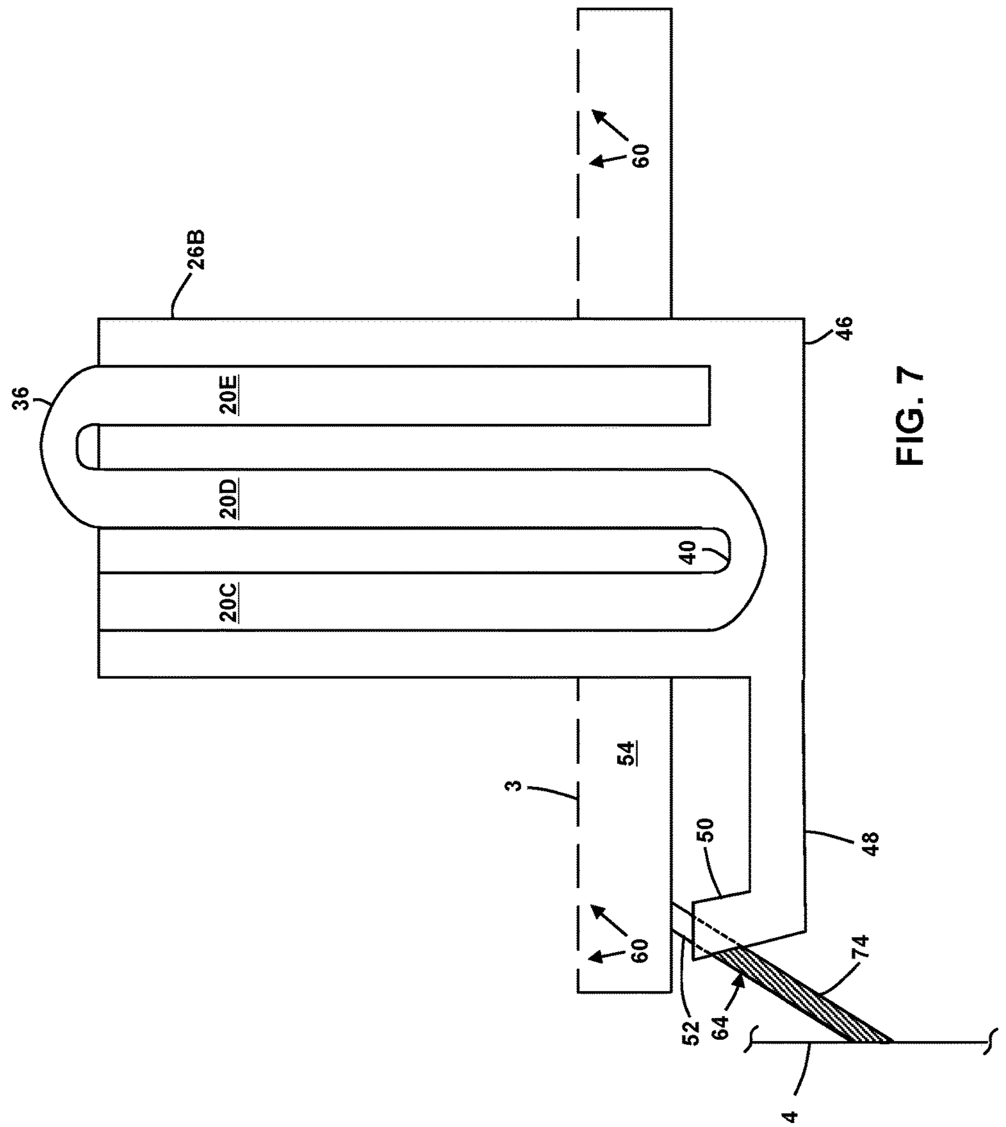

As shown in FIG. 7, a plug 74 (e.g., a metal plug) is secured in the shank 4 to prevent cooling air 32 from escaping from the end tab 50 through the shank 4. The plug 74 may be secured, for example, via brazing or other suitable technique.

Figure 8:
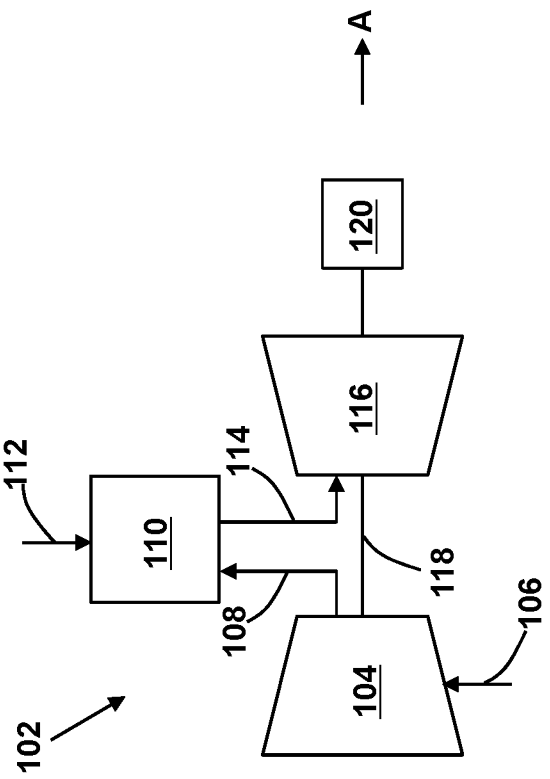
FIG. 8 is a schematic diagram of a gas turbine system according to various embodiments.

FIG. 8 shows a schematic view of gas turbomachine 102 as may be used herein. The gas turbomachine 102 may include a compressor 104. The compressor 104 compresses an incoming flow of air 106. The compressor 104 delivers a flow of compressed air 108 to a combustor 110. The combustor 110 mixes the flow of compressed air 108 with a pressurized flow of fuel 112 and ignites the mixture to create a flow of combustion gases 114. Although only a single combustor 110 is shown, the gas turbomachine 102 may include any number of combustors 110. The flow of combustion gases 114 is in turn delivered to a turbine 116, which typically includes a plurality of turbine buckets 2 (FIG. 1). The flow of combustion gases 114 drives the turbine 116 to produce mechanical work. The mechanical work produced in the turbine 116 drives the compressor 104 via a shaft 118, and may be used to drive an external load 120, such as an electrical generator and/or the like.

The platform core feed has been described for use with a mid-blade pressure side serpentine cooling circuit 30. However, the platform core feed may be used with any type of cooling circuit (non-serpentine, serpentine, etc.) in a multi-wall blade in which cooling air is collected in a cavity. For example, FIG. 9 depicts a side view of a cooling circuit 200 according to various embodiments.

Figure 9:
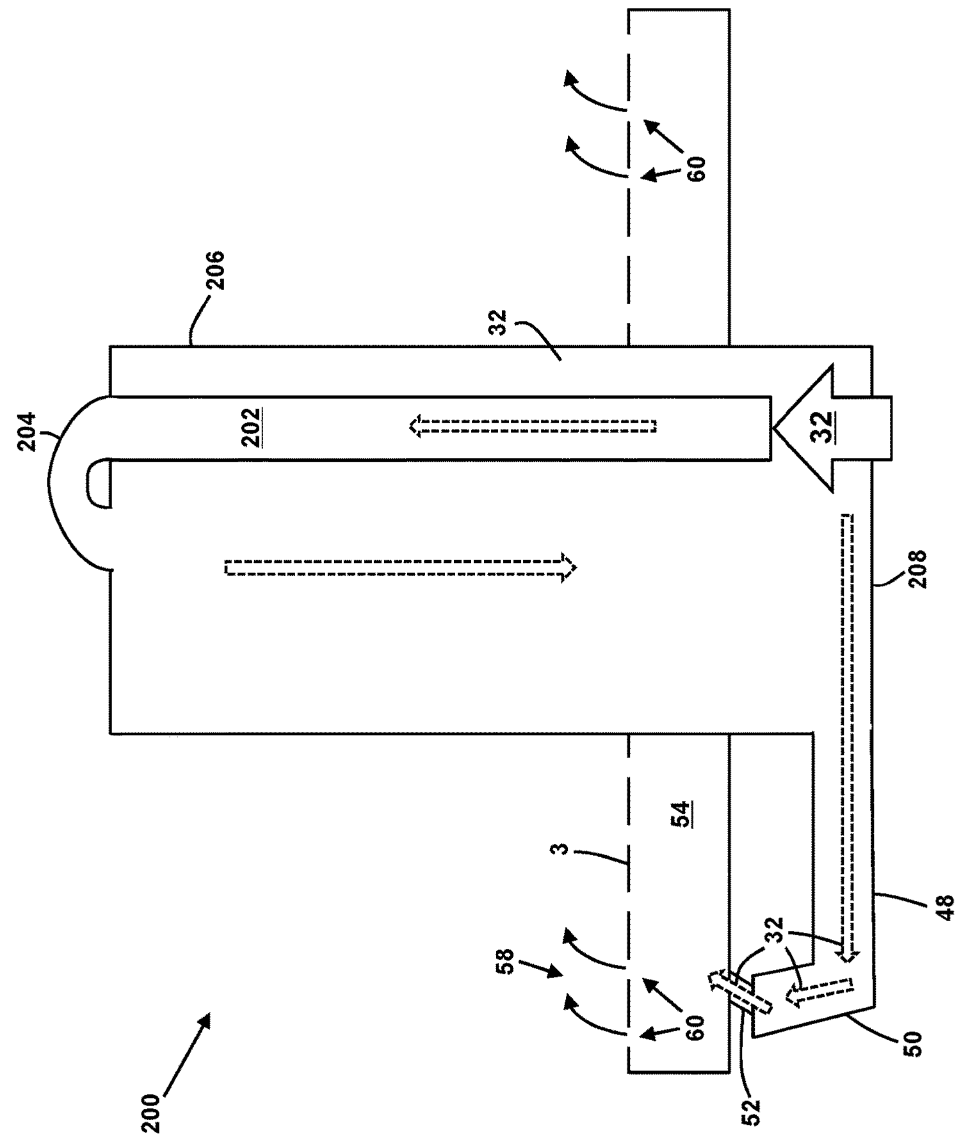
FIG. 9 is a side view of a cooling circuit according to various embodiments.

In FIG. 9, described together with FIG. 1, a supply of cooling air 32 is fed through the shank 4 to a base 34 of one or more outer cavities 202 (e.g., cavities 20, 22, 24, 26) of the multi-wall blade 6. Only one outer cavity 202 is depicted in FIG. 9. The cooling air 32 flows radially outward through the outer cavity 202 toward a tip area 38 of the multi-wall blade 6. A conduit 204 redirects the cooling air 32 from the outer cavity 202 into a central cavity 206 (e.g. central cavity 26). The cooling air 32 flows radially inward through the central cavity 206 toward a base 208 of the central cavity 206.

The cooling air 32 flows from the base 208 of the central cavity 206 into a platform core air feed 48, which extends away from the central cavity 206 toward a side of the shank 4. The platform core air feed 48 includes an end tab 50. An air passage 52 extends from the end tab 50 of the platform core air feed 48 into a core 54 of the platform 3. The air passage 52 allows the cooling air 32 to flow through the end tab 50 of the platform core air feed 48 into the platform core 54, cooling the platform 3 (e.g., via convection cooling). The platform 3 may comprise the pressure side platform 5 and/or the suction side platform 7. The cooling air 32 may exit as cooling film 58 from the platform core 54 via at least one film aperture 60 to provide film cooling of the platform 3.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling system for a turbine bucket including a multi-wall blade and a platform, the multi-wall blade extending radially away from a top surface of the platform, comprising:

a cooling circuit for the multi-wall blade, the cooling circuit including a pressure side outer cavity circuit, a suction side outer cavity circuit, and a central cavity extending radially within the multi-wall blade and disposed between the pressure side outer cavity circuit and the suction side outer cavity circuit for collecting cooling air from the pressure side outer cavity circuit;

a platform core air feed for receiving the cooling air from the central cavity, the platform core air feed extending outward below the platform within a shank of the turbine bucket toward a side of the turbine bucket; and an air passage for fluidly connecting the platform core air feed to a platform core of the platform, wherein the top surface of the platform includes a plurality of apertures for exhausting the cooling air from the platform core as cooling film.

2. The cooling system of claim 1, wherein the air passage comprises a portion of a hole, wherein the hole extends from an exterior of the side of the turbine bucket, through a portion of the platform core air feed, and into the platform core.

3. The cooling system of claim 2, wherein the portion of the platform core air feed includes an end tab.

4. The cooling system of claim 2, further including a plug for sealing the hole from the exterior of the side of the turbine bucket to the portion of the platform core air feed.

5. The cooling system of claim 2, wherein the exterior of the turbine bucket comprises the shank of the turbine bucket or a slash face of the platform.

6. The cooling system of claim 1, wherein the pressure side outer cavity circuit comprises a three-pass pressure side serpentine circuit.

7. A turbomachine, comprising:

a gas turbine system including a compressor component, a combustor component, and a turbine component, the turbine component including a plurality of turbine buckets, and wherein at least one of the turbine buckets includes a multi-wall blade and a platform, the multi-wall blade extending radially away from a top surface of the platform; and a cooling circuit disposed within the multi-wall blade, the cooling circuit including:

a pressure side outer cavity circuit, a suction side outer cavity circuit, and a central cavity extending radially within the multi-wall blade and disposed between the pressure side outer cavity circuit and the suction side outer cavity circuit for collecting cooling air from the pressure side outer cavity circuit;

a platform core air feed for receiving the cooling air from the central cavity, the platform core air feed extending outward below the platform within a shank of the turbine bucket toward a side of the turbine bucket; and an air passage for fluidly connecting the platform core air feed to a platform core of the platform, wherein the top surface of the platform includes a plurality of apertures for exhausting the cooling air from the platform core as cooling film.

8. The turbomachine of claim 7, wherein the air passage comprises a portion of a hole, wherein the hole extends from an exterior of the side of the turbine bucket, through a portion of the platform core air feed, and into the platform core.

9. The turbomachine of claim 8, further including a plug for sealing the hole from the exterior of the side of the turbine bucket to the portion of the platform core air feed.

10. The turbomachine of claim 8, wherein the exterior of the turbine bucket comprises the shank of the turbine bucket or a slash face of the platform.

* * * * *